(12) United States Patent
Hölzel et al.

(10) Patent No.: US 11,203,256 B2
(45) Date of Patent: Dec. 21, 2021

(54) VEHICLE ROOF COMPRISING A MOBILE ROOF ELEMENT

(71) Applicant: WEBASTO SE, Stockdorf (DE)

(72) Inventors: Dominik Hölzel, Olching (DE); Gerhard Skorianz, Stockdorf (DE); Björn Pluciennik, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/800,595

(22) Filed: Feb. 25, 2020

(65) Prior Publication Data

US 2020/0207195 A1 Jul. 2, 2020

Related U.S. Application Data

(62) Division of application No. 15/758,219, filed as application No. PCT/EP2016/069435 on Aug. 16, 2016, now abandoned.

(30) Foreign Application Priority Data

Sep. 10, 2015 (DE) ...................... 10 2015 115 233.9

(51) Int. Cl.
*B60J 7/057* (2006.01)
*B60J 7/02* (2006.01)

(52) U.S. Cl.
CPC ............... *B60J 7/057* (2013.01); *B60J 7/02* (2013.01); *B60J 7/0573* (2013.01); *E05Y 2201/654* (2013.01); *E05Y 2201/66* (2013.01); *E05Y 2201/684* (2013.01)

(58) Field of Classification Search
CPC .. B60J 7/057; B60J 7/0573; B60J 7/02; E05F 2201/684; E05F 2201/66; E05F 2201/654

USPC ............................................... 296/223
See application file for complete search history.

(56) References Cited

U.S. PATENT DOCUMENTS

| | | |
|---|---|---|
| 3,190,140 A | 6/1965 | Werner |
| 4,811,985 A | 3/1989 | Kruger et al. |
| 6,024,404 A | 2/2000 | Stallfort et al. |
| 7,644,980 B2 | 1/2010 | Hager et al. |
| 8,075,050 B2 | 12/2011 | Hotta et al. |
| 2013/0000427 A1 | 1/2013 | Stenzel |

(Continued)

FOREIGN PATENT DOCUMENTS

| | | |
|---|---|---|
| CN | 101218117 A | 7/2008 |
| CN | 101780758 A | 7/2010 |
| CN | 102762398 A | 10/2012 |

(Continued)

OTHER PUBLICATIONS

First Office Action issued against corresponding Chinese Patent Application No. 201680052304 dated Mar. 25, 2020 in Chinese (8 pages).

(Continued)

*Primary Examiner* — Dennis H Pedder
(74) *Attorney, Agent, or Firm* — Fitch, Even, Tabin & Flannery, LLP

(57) ABSTRACT

A vehicle roof is provided having a mobile roof element which can be moved by means of a drive carriage which is connected to the roof part and can be movably guided in a guide rail, a drive cable for moving the drive carriage, and a cable connection which connects the drive cable to the drive carriage. The cable connection may have a metal element. In one approach the metal element positively engages in a cable coil arranged on the drive cable.

2 Claims, 6 Drawing Sheets

(56) References Cited

U.S. PATENT DOCUMENTS

2013/0320717 A1    12/2013   Radmanic
2015/0130229 A1     5/2015   Nagashima et al.

FOREIGN PATENT DOCUMENTS

| CN | 103929013 A | 7/2014 |
|---|---|---|
| DE | 201 11 621 U1 | 9/2001 |
| DE | 103 36 618 A1 | 5/2005 |
| DE | 10 2004 033 544 B3 | 2/2006 |
| DE | 10 2006 051 488 A1 | 5/2008 |
| DE | 10 2007 001 286 A1 | 7/2008 |
| DE | 10 2010 008 365 A1 | 8/2011 |
| DE | 10 2010 055 456 A1 | 6/2012 |
| DE | 10 2012 024 332 A1 | 6/2014 |
| EP | 0 888 918 A2 | 1/1999 |
| EP | 2 853 424 A1 | 4/2015 |

OTHER PUBLICATIONS

International Search Report for PCT/EP2016/069435 dated Dec. 8, 2016 and English translation submitted herewith (7 Pages).
Written Opinion of the International Searching Authority for PCT/EP2016/069435 dated Dec. 8, 2016 and English translation submitted herewith (5 Pages).

VEHICLE ROOF COMPRISING A MOBILE ROOF ELEMENT

CROSS-REFERENCE TO RELATED APPLICATIONS

This application is a Divisional Application of U.S. application Ser. No. 15/758,219 filed Mar. 7, 2018, which claims priority from International Application No. PCT/EP2016/069435, filed Aug. 16, 2016, designating the United States, which claims priority from German Patent Application 10 2015 115 233.9, filed Sep. 10, 2015, which are hereby incorporated herein by reference in their entirety for all purposes.

FIELD

The present invention relates to a vehicle roof according to the generic part of Claim 1.

BACKGROUND

Such a vehicle roof is known from DE 10 2010 055 456 A1. A movable cover for closing an opening in a vehicle roof is movably guided by a drive carriage relative to the vehicle body. A drive cable is provided for moving the drive carriage and with it the cover. A cable connection connects the drive cable to the drive carriage and is constructed as a plastic injection molding cover around the drive cable.

Such a known vehicle roof has the disadvantage that in case of an accident the plastic cable connection can tear off due to the high forces which occur. As a consequence, the cover is separated from the drive cable. Therefore, dangerously high relative speeds are created between the movable cover and the vehicle body.

The present invention therefore has the problem of creating a vehicle roof with a mobile roof element which overcomes these disadvantages.

This problem is solved by a vehicle roof according to claim 1.

According to the invention the cable connection comprises a metal element. Such a cable connection can receive considerably greater forces than a plastic injection molding cover and therefore increases the safety during an accident.

Preferred embodiments result from the subclaims.

In a preferred embodiment of the invention the cable connection comprises a plastic injection molding cover with which the drive cable is injection molded onto a connection section. The metal element is constructed as a sheet inserter which is embedded at least partially in the plastic injection molding cover. This has the advantage that the plastic improves the sliding properties of the cable connection. Since the sheet inserter considerably increases the strength of the cable connection over the embodiments known from the prior art, a favorable material can be used for the plastic injection molding cover and/or a material which is more optimized regarding the sliding properties.

In another preferred embodiment of the invention the metal element is welded to the drive cable. Such a welding increases the stability of the cable connection even more. The danger that the metal element of the cable connection is separated from the drive cable is distinctly reduced in this manner. The welding can take place by means of punctual welding points of a laser welding seam. The two welded elements (metal element and drive cable) can be subsequently inserted into a foaming tool if the cable connection is also to receive a plastic injection molding cover. Such a plastic injection molding cover can cover the welding seam. In an embodiment in which the drive cable comprises a cable coil which runs as an outside winding around the drive cable, the metal element can be welded to the cable coil. Such a cable coil is usually provided when the drive cable should be moved by a pinion of a drive for the mobile roof element. A corresponding drive pinion then engages into the cable coil and a rotation of the drive pinion moves the drive cable in a guide conduit. According to the present invention the metal element can be welded here onto the radially outside points of the outside winding or of the cable coil.

In an alternative embodiment of the invention the metal element can positively engage into a cable coil arranged on the drive cable in that, for example, the metal element comprises a row of teeth which are arranged in series and along a longitudinal direction of the drive cable and which positively engage into the cable coil of the drive cable. This also significantly improves the connection of the metal element to the drive cable.

The previously explained, preferred embodiment of the present invention relate to an improved connection of the metal element to the drive cable. However, in a mobile roof element which can be in particular a cover for closing an opening in a vehicle roof, the entire area of the cable connection which connects the drive cable to the drive carriage should be considered. A corresponding flow of force through the cable connection runs from the drive cable via the metal element to the drive carriage. Therefore, other supplementary or alternative embodiments of the present invention are designed to also improve the connection of the metal element to the drive carriage.

SUMMARY

Therefore, in a preferred embodiment of the present invention the metal element is welded, riveted, cogged, hooked, clipped or screwed to the drive carriage. As a consequence, significantly higher forces from the connection between the drive cable and the drive carriage can be received without a tearing off occurring. In the case of a welding or a cogging, the same elements can be used which were described further above regarding the connection of the metal elements to the drive cable. The term hooking denotes that appropriate projections of the metal element engage into openings of the drive carriage or, inversely, projections of the drive carriage engage into corresponding openings of the metal element, wherein a direction of the engagement takes place transversely to a longitudinal extension of the drive cable, that is, transversely to a loading direction in the case of an abrupt braking of the vehicle.

To this end the metal element can comprise a continuation which is aligned substantially transversely to a longitudinal axis of the drive cable and to the drive carriage, wherein the metal element is connected in the area of this continuation to the described fastening methods to the drive carriage.

Other embodiments of the present invention relate to positive connections of the cable connection to the drive carriage. On the one hand, the metal element of the cable connection can enter a positive connection to the drive carriage. That means that the metal element enters the positive connection to the drive carriage in an area which is not injection-molded with a plastic cover. Alternatively, an injection-molded section of the metal element can enter the positive connection to the drive carriage or as another alternative only the plastic injection-molded cover of the cable connection.

A positive connection of the metal element to the drive carriage can be realized, for example, in that the cable connection comprises a pin element which connects the metal element to the drive carriage, wherein the pin element is preferably aligned transversely to a longitudinal axis of the drive cable. This has the advantage that the pin element cannot be loosened by the forces of an accident. An opening can be provided in the metal element and at least one opening in the drive carriage, wherein the pin element is guided through both openings and therefore establishes the positive connection between the metal element and the drive carriage. The opening can be provided on the metal element in a section in which the metal element is molded over by the plastic injection molding.

The metal element and also the drive carriage can comprise a continuation which engages in the first case into an associated opening in the drive carriage and in the second case into an associated opening in the metal element. Here too, the corresponding continuation is aligned transversely to the longitudinal axis of the drive cable. The non-positive connection can be provided here in the section of the metal element which is molded over, or which is free of the plastic injection molding cover.

A corresponding non-positive connection of the cable connection to the drive carriage can also be provided by the plastic injection molding cover alone, therefore in the areas of the cable connection in which the plastic injection molding cover in the interior is not supported by the metal element in the form of the sheet inserter.

Furthermore, in all embodiments of the present invention the connection of the metal element to the drive cable can be further reinforced if the metal element has a continuation which is formed on the drive cable and surrounds it at least partially.

The present invention is explained in detail in an exemplary manner in the following using the figures.

BRIEF DESCRIPTIONS OF THE DRAWINGS

DETAILED DESCRIPTION

Figure 1:
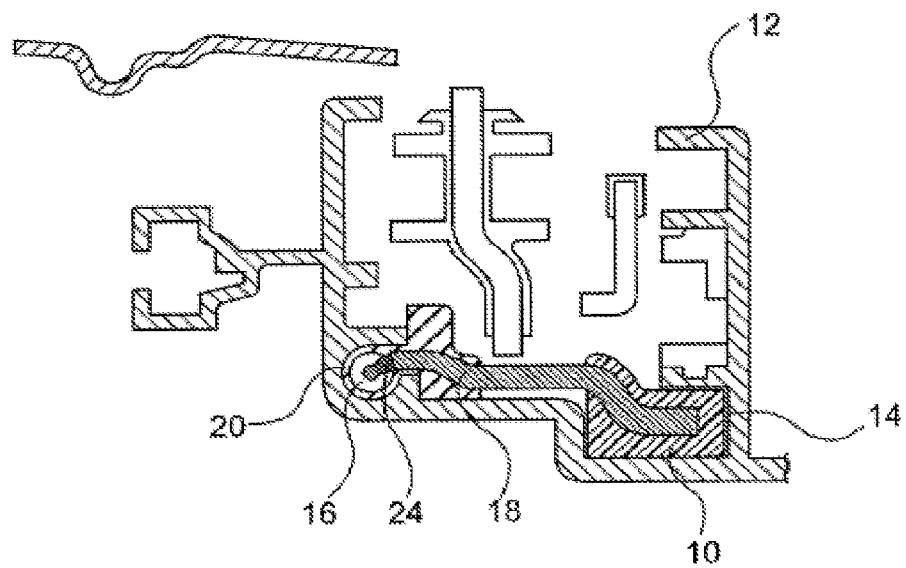
FIGS. 1 and 2 show a first embodiment of the present invention in which a metal element is welded to a drive cable 16.
Figure 2:
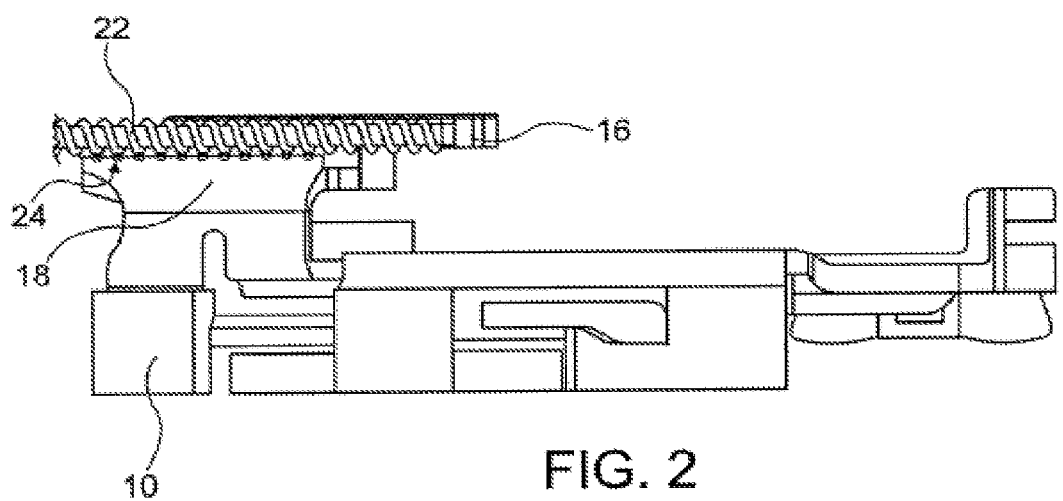

FIG. 1 shows a drive carriage 10 for guiding and moving a mobile roof element, which is not shown, such as a cover for a vehicle roof which can be opened, wherein the drive carriage 10 is guided in a guide channel 14 of a guide rail 12. The guide rail 12 is arranged fixed to the roof in the longitudinal direction of the roof of a vehicle roof. A drive cable 16 is provided which is also movably guided in the guide rail 12 and with which the drive carriage 10 can be moved. A cable connection for the non-positive connection of the drive cable 16 to the drive carriage 10 comprises a metal element 18 and a plastic injection molding cover 20 which surrounds the drive cable 16 and the metal element 18 in the area of this cable connection. It can also be provided here that the plastic injection molding cover 20 also surrounds the drive carriage 10 at least partially. In order to increase the connection of the metal element 18, which is designed here as a sheet inserter in the plastic injection molding cover 20, to the drive cable 16, several welding points 24 of a laser welding seam are provided which connect the metal element 18 to the drive cable 16. Whereas FIG. 1 shows the area of the cable connection in a transverse sectional view, this area is shown in FIG. 2 in a top view. As can be recognized here, the drive cable 16 comprises a cable coil 22 and the welding points 24 for connecting the drive cable 16 to the metal element 18 are arranged in the area of the cable coil 22. Therefore, the radially outward located elevations of the cable coil 22 are connected via the welding points 24 to the metal element 18.

Figure 3:
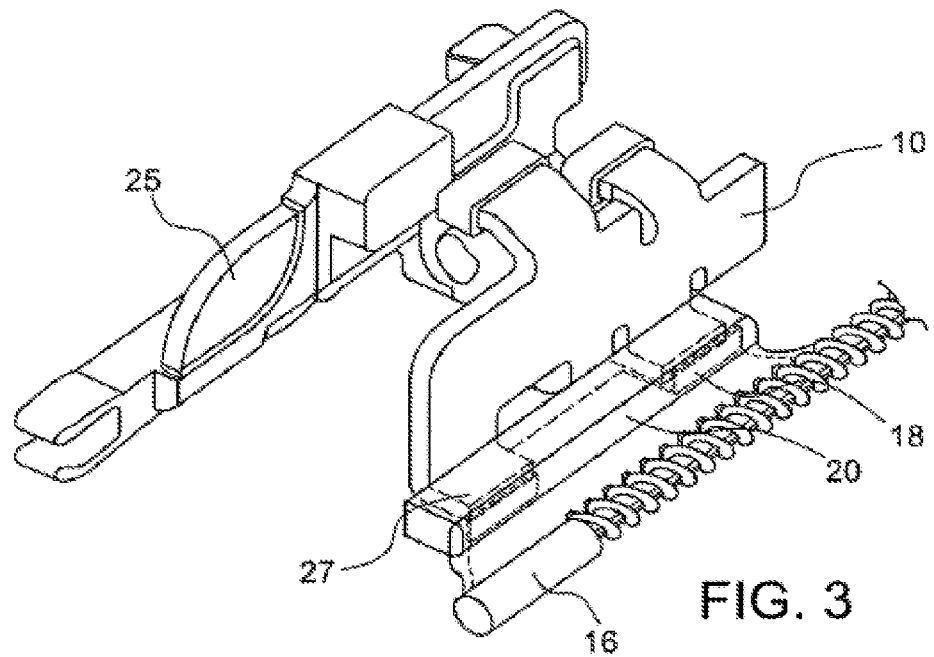
FIGS. 3 and 4 show an embodiment of the present invention in which a metallic element is cogged to a drive cable.
Figure 4:
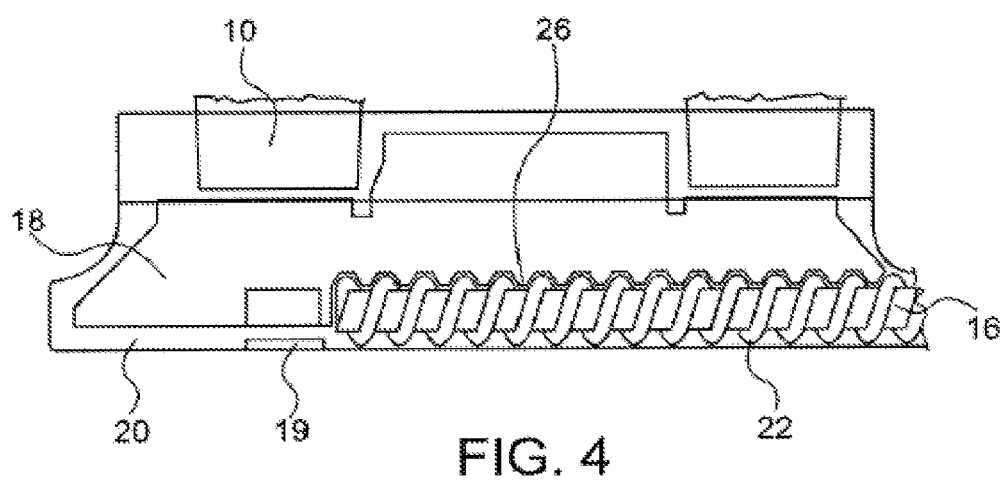

FIGS. 3 and 4 show a modification of the embodiment of FIGS. 1 and 2. A drive carriage 10 is also shown here which is connected to a roof mechanism 25 which guides a mobile cover, which is not shown, along the vehicle roof. A drive cable 18 is connected via a cable connection to the drive carriage 10, wherein the cable connection again comprises a metal element 18 here in the form of a sheet inserter which is embedded in a plastic injection molding cover. The plastic injection molding cover 20 also surrounds the adjacent areas of the drive cable 16. As in the embodiment of the two previous figures, a cable coil 22 is arranged on the outside of the drive cable 16. Two plug connections 27 connect the drive carriage 10 to the cable connection in that continuations of the drive carriage 10 extend into corresponding openings of the plastic injection molding cover 20. These receptacles in the cable connection can be formed by the plastic injection molding cover 20 alone or also by the metal element 18 as a supplement in order to increase the strength.

Whereas in the embodiment of FIGS. 1 and 2 the connection of the metal element 18 to the guide cable 14 and the cable coil 22 is realized via a welding connection, in the embodiment of FIGS. 3 and 4 a cogging of metal element 18 with the cable coil 22 of the drive cable 16 is provided. To this end cogs 26 are provided on the metal element 18 which are constructed (as regards cog height and cog distance) so that the cogs 26 engage into the cable coil 22. As a result of the engagement of the cogs 26 into the cable coil 22, the strength of the cable connection is significantly improved, in particular for a loading direction along the drive cable 16, in comparison to known embodiments in which no metal element 18 is provided.

Other preferred embodiments of the present invention are explained in the following using FIG. 5. As in the previous examples, a drive carriage 10 is connected by a cable connection to a drive cable 16. The cable connection comprises a metal element 18 here for reinforcement and comprises a plastic injection molding cover 20 which surrounds the metal element 18 and adjacent areas of the drive carriage 16. In comparison to the embodiment of FIG. 3, in addition to two plug connections 27 and 29 in which continuations of the drive carriage 10 engage into openings of the cable connection and/or their plastic injection molding cover 20, a third connection is provided in the area of a continuation 28 of the drive carriage 10. This continuation 28 also engages into an opening of the cable connection. Therefore, occurring forces are distributed not only on two but rather three connections between the drive carriage and the cable connection, which increases the loadability of the system. Furthermore, in the embodiment of FIG. 5 the third connection is arranged elevated by the continuation 28 in comparison to the two plug connections 27 and 29. Therefore, the two plug connections 27 and 29 are located in a plane which is arranged substantially parallel to the roof skin and the third connection is arranged elevated by the continuation 28 in comparison to this plane. Therefore, even torques acting on the cable connection can be better removed.

Figure 5:
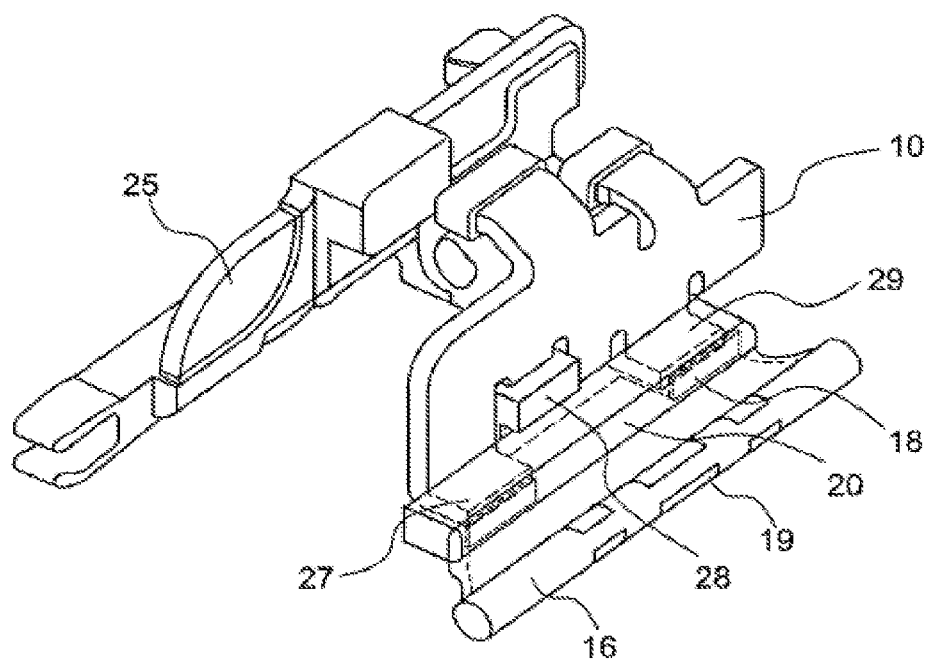
FIG. 5 shows a positive connection of the metal element to a drive carriage.

Furthermore, the metal element 18 of the embodiment of FIG. 5 comprises continuations 19 which surround at least partially the drive cable 16. The continuations 19 of the metal element 18 are arranged in such a manner here that the drive cable 16 is surrounded pairwise on two sides like by a clamp. This embodiment of the metal element 18 can be used with all variants of the present invention in order to further reinforce the connection of the metal element 18 to the drive cable 16.

Figure 6:
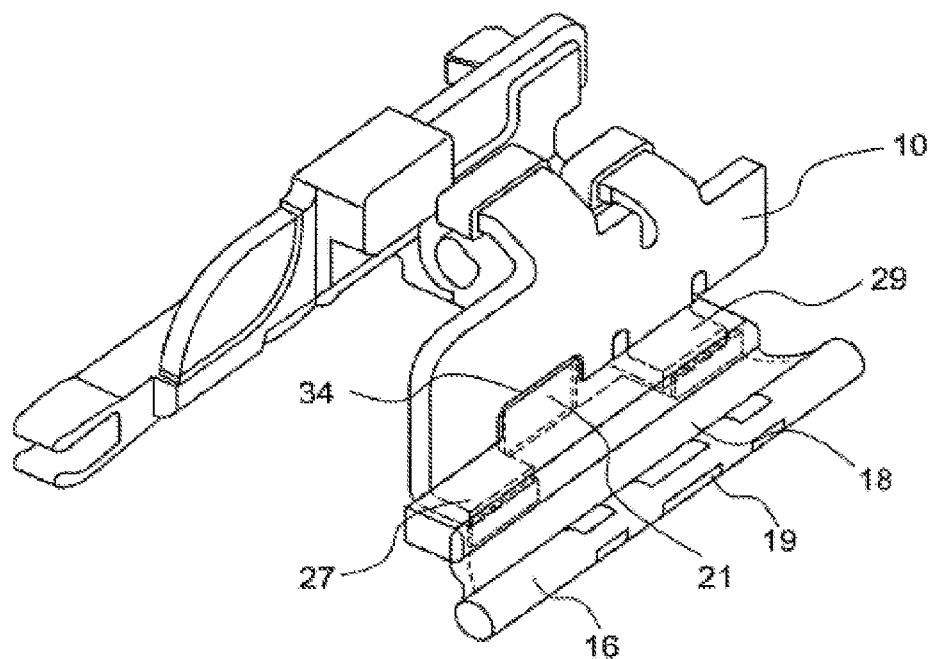
FIG. 6 shows an alternative, positive connection to FIG. 5.

FIG. 6 shows an embodiment of the present invention in which a metallic element 18 has a projection 21 which engages into a corresponding recess 34 of a drive carriage 10 in order to achieve a geometric hooking behind of the metal element 18 in the drive carriage 10. The projection 21 is aligned upward in the built-up state in the vehicle roof and therefore forms a rectangular, plate-shaped section of the metal element 18 with a longitudinal axis aligned substantially along the longitudinal axis of the vehicle. The recess 34 is a geometrically corresponding section of a plate-shaped section of the drive carriage 10 and also aligned vertically and in the longitudinal direction of the vehicle. Of course, as an alternative the drive carriage 10 can also comprise the projection and the metal element 18 a corresponding recess. The corresponding elements of the cable connection (projection or recess) can also be formed solely by the plastic injection molding cover 20. This would mean that the metal element 18 ends already in front of this connection area between the cable connection and the drive carriage 10. However, the variant shown offers an advantage regarding the strength of the connection.

Figure 7:
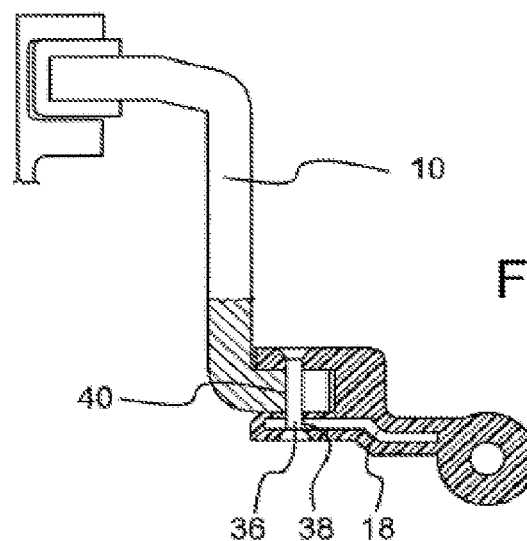
FIGS. 7 and 8 show a connection of a metal element to a drive carriage by a pin.
Figure 8:
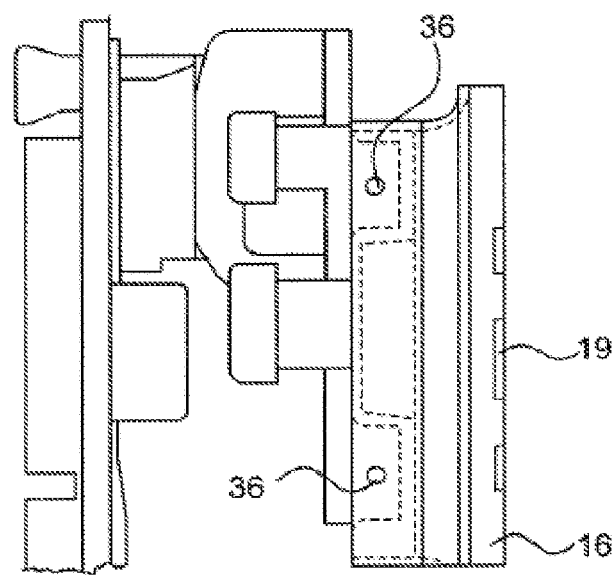

FIGS. 7 and 8 show another embodiment of the present invention in cross section (FIG. 7) and in a top view (FIG. 8). Here, a metal element 18 is a cable connection positively connected to a drive carriage 10 by a pin 36. The pin 36 is inserted here through corresponding openings 38 and 40 in the metal element 18 and in the drive carriage 10 and is fixed in a direction vertically to the vehicle roof and vertically to the direction of travel. As the top view of FIG. 8 shows, several such pins 36 can be provided in order to reinforce the connection of the metal element 18 to the drive carriage 10. A plastic injection molding cover can be provided as a supplement which surrounds only the drive cable 16 shown or also the area in which pins 36 are arranged.

Figure 9:
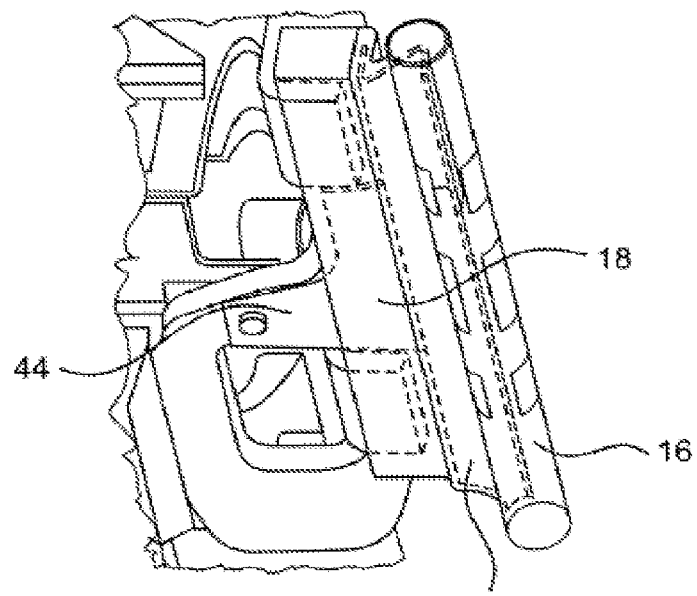
FIGS. 9 and 10 show a connection of a metal element to a drive carriage by a continuation of the metal element.
Figure 10:
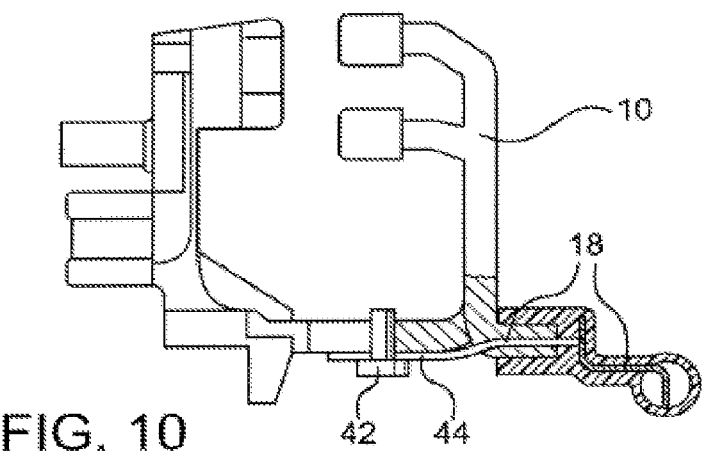

A similar variant is illustrated in FIGS. 9 and 10, wherein FIG. 9 shows a view from below onto a cable connection and FIG. 10 shows a cross section through the cable connection. In this embodiment of the present invention a metallic element 18 of the cable connection has a prolongation 44 which is guided in an area underneath a drive carriage 10. The prolongation 44 is designed like a plate and is aligned in the direction away from a drive cable 16 located outside inwardly toward the drive carriage 10. As the cross-sectional view of FIG. 10 shows, the prolongation 44 of the metal element is screwed by a screw coupling 42 to the drive carriage 10. This again distinctly reinforces the connection of the metal element 18 to the drive carriage 10 by an additional positive connection in the form of the screw coupling 42. The prolongation 44 can also be welded or riveted to the drive carriage.

In all embodiments the metal element 18 can also positively engage into the drive cable 16 itself and improve the connection in this manner. The drive cable 16 or an element connected to it can comprise to this end an opening such as a slot which receives an associated end of the metal element 18. This is indicated in FIG. 10 on the end of the metal element 18 facing away from the prolongation 44 (the drive cable itself is not shown here).

LIST OF REFERENCE NUMERALS 10 drive carriage
12 guide rail
14 guide channel
16 drive cable
18 metal element
19 continuation of 18
20 plastic injection molding cover
21 projection of 18
22 cable coil
24 welding point
25 cover mechanism
26 cogs
27 plug connection
28 continuation of 10
29 plug connection
30 flank
32 flank
34 recess
36 pin
38 opening in 18
40 opening in 10
42 screw coupling
44 prolongation of 18

The invention claimed is:

1. A vehicle roof comprising:
a mobile roof element which is movable by a drive carriage which is connected to the roof element and is guided in shiftable manner in a guide rail,
a drive cable for moving the drive carriage, and
a cable connection which connects the drive cable to the drive carriage,
wherein the cable connection has a metal element,
wherein the cable connection has a plastics encapsulation with which the drive cable is encapsulated on a connecting portion by injection molding, the metal element is configured as a sheet-metal insert which is at least partially embedded in the plastics encapsulation, and
wherein the metal element engages in a form-fitting manner in a cable coil arranged on the drive cable.

2. The vehicle roof according to claim 1, wherein the metal element comprises a row of cogs which are arranged in a series and along the longitudinal direction of the drive cable and positively engage in the cable coil of the drive cable, wherein the cable coil runs as an outer threading around the drive cable.

* * * * *